(12) United States Patent
Kelly et al.

(10) Patent No.: US 10,859,178 B2
(45) Date of Patent: Dec. 8, 2020

(54) BLEED VALVES

(71) Applicant: Hamilton Sundstrand Corporation, Charlotte, NC (US)

(72) Inventors: Myles R. Kelly, Willimantic, CT (US); James S. Elder, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 90 days.

(21) Appl. No.: 15/989,703

(22) Filed: May 25, 2018

(65) Prior Publication Data

US 2019/0360598 A1    Nov. 28, 2019

(51) Int. Cl.
*F16K 31/122*    (2006.01)
*G05D 16/10*    (2006.01)
(Continued)

(52) U.S. Cl.
CPC ........... *F16K 31/1221* (2013.01); *F16K 1/00* (2013.01); *F16K 17/30* (2013.01); *G05D 16/04* (2013.01); *G05D 16/0402* (2019.01); *G05D 16/10* (2013.01); *Y10T 137/774* (2015.04); *Y10T 137/7738* (2015.04); *Y10T 137/7739* (2015.04); *Y10T 137/7793* (2015.04); *Y10T 137/7795* (2015.04)

(58) Field of Classification Search
CPC ........ F16K 31/1221; F16K 1/00; F16K 17/30; G05D 16/04; G05D 16/10; G05D 16/0402
USPC ............... 137/471, 469, 470, 505.12, 505
See application file for complete search history.

(56) References Cited

U.S. PATENT DOCUMENTS 2,478,040 A * 8/1949 Campbell, Jr. .... G05D 16/0669
137/505.42
3,747,629 A * 7/1973 Bauman ............. G05D 16/0661
137/270
(Continued)

FOREIGN PATENT DOCUMENTS

EP        3561264 A1    10/2019

OTHER PUBLICATIONS

Extended European Search Report dated Oct. 24, 2019, issued during the prosecution of corresponding European Patent Application No. EP 19176440.6.
(Continued)

*Primary Examiner* — Umashankar Venkatesan
(74) *Attorney, Agent, or Firm* — Locke Lord LLP; Joshua L. Jones; Scott D. Wofsy

(57) ABSTRACT

A bleed valve includes a valve housing defining an inlet and an outlet with a flow path for fluid communication from the inlet to the outlet. A poppet head is connected to the valve housing by a primary spring and a secondary spring. The poppet head is configured for movement relative to the valve housing between: a fully open position in which the poppet head is spaced apart from the inlet to allow flow through the flow path, with the primary spring and secondary spring both expanded; a partially closed position in which the poppet head is spaced apart from the inlet but is closer to the inlet than in the fully open position, with the primary spring compressed; and a fully closed position in which the poppet head seats against the valve housing blocking flow through the flow path, with the primary spring and the secondary spring both compressed.

16 Claims, 5 Drawing Sheets

(51) Int. Cl.
*G05D 16/04* (2006.01)
*F16K 17/30* (2006.01)
*F16K 1/00* (2006.01)

(56) References Cited

U.S. PATENT DOCUMENTS

| | | | | |
|---|---|---|---|---|
| 3,825,029 | A * | 7/1974 | Genbauffe | F16K 31/365 |
| | | | | 137/271 |
| 4,064,906 | A * | 12/1977 | Berg | F16K 17/044 |
| | | | | 137/529 |
| 4,778,104 | A * | 10/1988 | Fisher | G05D 23/025 |
| | | | | 137/468 |
| 5,174,332 | A | 12/1992 | Yokoyama et al. | |
| 5,755,254 | A * | 5/1998 | Carter | G05D 16/0655 |
| | | | | 137/340 |
| 6,253,708 | B1 * | 7/2001 | Johnson | A01K 39/02 |
| | | | | 119/72 |
| 7,905,467 | B2 | 3/2011 | Szymaszek | |
| 8,695,629 | B2 * | 4/2014 | Hsiao | G05D 16/0691 |
| | | | | 137/495 |
| 8,814,498 | B2 | 8/2014 | Goodman et al. | |
| 9,752,513 | B2 | 9/2017 | Fong et al. | |
| 10,273,884 | B2 * | 4/2019 | Ribarov | F16K 1/126 |
| 2009/0007973 | A1 * | 1/2009 | Benvenuto | G05D 16/0661 |
| | | | | 137/505 |
| 2012/0128470 | A1 * | 5/2012 | Goodman | F01D 17/105 |
| | | | | 415/145 |
| 2016/0230904 | A1 | 8/2016 | Zarrabi et al. | |
| 2017/0022986 | A1 | 1/2017 | McIntyre et al. | |
| 2017/0356348 | A1 | 12/2017 | Ribarov et al. | |

OTHER PUBLICATIONS

Communication Pursuant to ART 94(3) EPC dated Jan. 3, 2020, issued during the prosecution of European Patent Application No. EP 19176440.6.

* cited by examiner

BLEED VALVES

BACKGROUND OF THE INVENTION

1. Field of the Invention

The present disclosure relates to valves, and more particularly to bleed valves such as used to facilitate start up for gas turbine engines.

2. Description of Related Art

Gas turbine engines are provided with a number of functional sections, including a fan section, a compressor section, a combustion section, and a turbine section. At start-up, the turbine section of the gas turbine engine has not begun to fully provide power. Driving the compressor, as an example, is more challenging than at steady state conditions and a bleed valve is typically utilized to bleed air away from the compressor section during start-up to reduce the load on the compressor section.

The conventional techniques have been considered satisfactory for their intended purpose. However, there is an ever present need for improved bleed valves. This disclosure provides a solution for this need.

SUMMARY OF THE INVENTION

A bleed valve includes a valve housing defining an inlet and an outlet with a flow path for fluid communication from the inlet to the outlet. A poppet head is connected to the valve housing by a primary spring and by a secondary spring. The poppet head is configured for movement relative to the valve housing between: a fully open position in which the poppet head is spaced apart from the inlet to allow flow through the flow path, wherein the primary spring and secondary spring are both expanded; a partially closed position in which the poppet head is spaced apart from the inlet but is closer to the inlet than in the fully open position, wherein the primary spring is compressed; and a fully closed position in which the poppet head seats against the valve housing blocking flow through the flow path, wherein the primary spring and the secondary spring are both compressed.

The primary spring and the secondary spring can both be biased to position the poppet head in the fully open position. The primary spring and the secondary spring can both be biased in a single direction. The primary and secondary spring can be aligned along a longitudinal axis, wherein the inlet opens along the longitudinal axis, and wherein the outlet opens laterally with respect to the longitudinal axis.

A secondary spring compressor can be included within the valve housing. The primary spring can connect between the poppet head and the secondary spring compressor. The secondary spring can connect between the secondary spring compressor and the valve housing. The valve housing can include a first secondary spring compressor seat configured to engage the secondary spring compressor in at least the fully open position to limit travel of the secondary spring compressor thereby limiting expansion of the secondary spring. The valve housing can include a second secondary spring compressor seat configured to engage the secondary spring compressor in the fully closed position to limit travel of the secondary spring compressor thereby limiting compression of the secondary spring.

A primary spring compressor can be included within the valve housing. The primary spring can connect between the primary spring compressor and the secondary spring compressor. The poppet head can be joined to the primary spring compressor. The housing can include a primary spring compressor seat configured to engage the primary spring compressor in the fully open position to limit travel of the primary spring compressor thereby limiting expansion of the primary spring. The secondary spring compressor can include a seating surface configured to engage the primary spring compressor in the partially closed and fully closed positions thereby limiting compression of the primary spring.

The primary spring compressor can include a piston surface that is aligned with the longitudinal axis that engages a corresponding piston surface of the valve housing. The secondary spring compressor can include a piston surface that is aligned with the longitudinal axis that engages a corresponding piston surface of the valve housing.

The primary spring can have a spring constant lower than that of the secondary spring. Peak opening force can be defined as the product of maximum stroke times spring constant, and the primary spring can have a peak opening force weaker than that of the secondary spring. The secondary spring can be pre-loaded pressing the secondary spring compressor against the first secondary spring compressor seat in the fully open and partially closed positions with a pre-loading force. The peak opening force of the primary spring can be weaker than the pre-loading force of the secondary spring so that in the partially closed position, the primary spring is compressed to its maximum stroke and the secondary spring is expanded to its maximum stroke.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
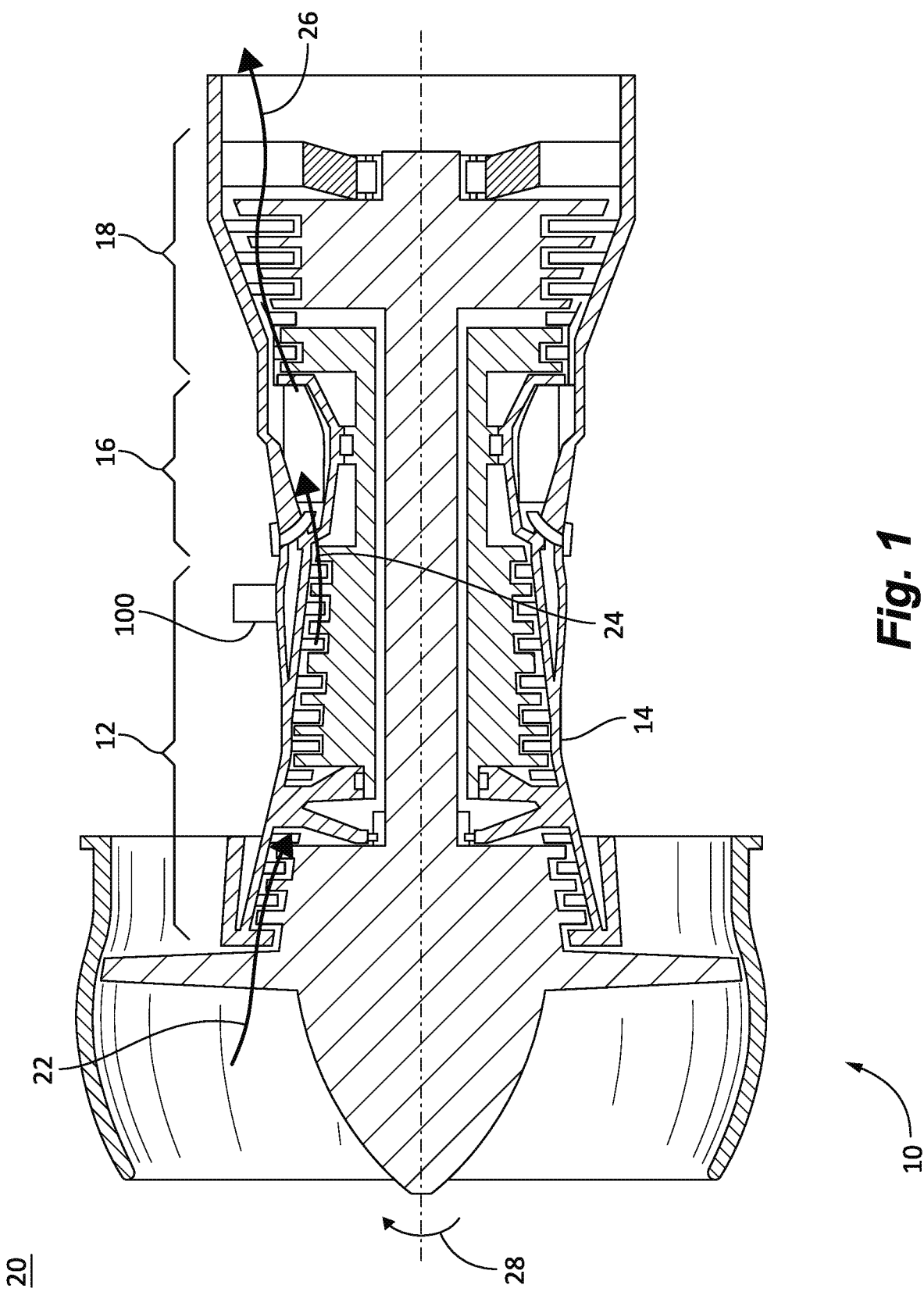
FIG. 1 is a schematic cross-sectional side elevation view of an gas turbine engine in accordance with the present disclosure.

Reference will now be made to the drawings wherein like reference numerals identify similar structural features or aspects of the subject disclosure. For purposes of explanation and illustration, and not limitation, a partial view of an exemplary embodiment of a bleed valve in accordance with the disclosure is shown in FIG. 3 and is designated generally by reference character 100. Other embodiments of bleed valves in accordance with the disclosure, or aspects thereof, are provided in FIGS. 1-2 and 4-5, as will be described. The systems and methods described herein can be used to provide reliable passive closing and partial closing for bleed vales, e.g., to passively facilitate start up in gas turbine engines.

Referring to FIG. 1, a gas turbine engine 10 is shown. Gas turbine engine 10 includes a compressor section 12 with a case 14, a combustion section 16, and a turbine section 18. Compressor section 12 is disposed in fluid communication with external environment 20 and is arranged to compress fluid 22 ingested from external environment 20. Once compressed fluid 22 is communicated to combustion section 16 as a compressed fluid 24.

Combustion section 16 is disposed in fluid communication with compressor section 12, is arranged to receive therefrom compressed fluid 24, and generates high pressure combustion products 26 using compressed fluid 24 and fuel also provided to combustion section 16. High pressure combustion products 26 are provided by combustion section 16 to turbine section 18.

Turbine section 18 is disposed in fluid communication with combustion section 16 and is arranged to receive therefrom high pressure combustion products 26. The high pressure combustion products 26 are expanded by as they flow through turbine section 18, turbine section 18 extracting work 28 from combustion products 26 during expansion. Work 28 is provided to compressor section 12 to provide the input power necessary to compress fluid 22 to generate compressed fluid 24, the amount of work corresponding the amount of fluid and extent of compression required for the operating state of gas turbine engine 10. Bleed valve 100 is connected to case 14 for reducing amount of work 28 provided to compressor section 12 according to the operating regime of gas turbine engine 10.

Figure 2:
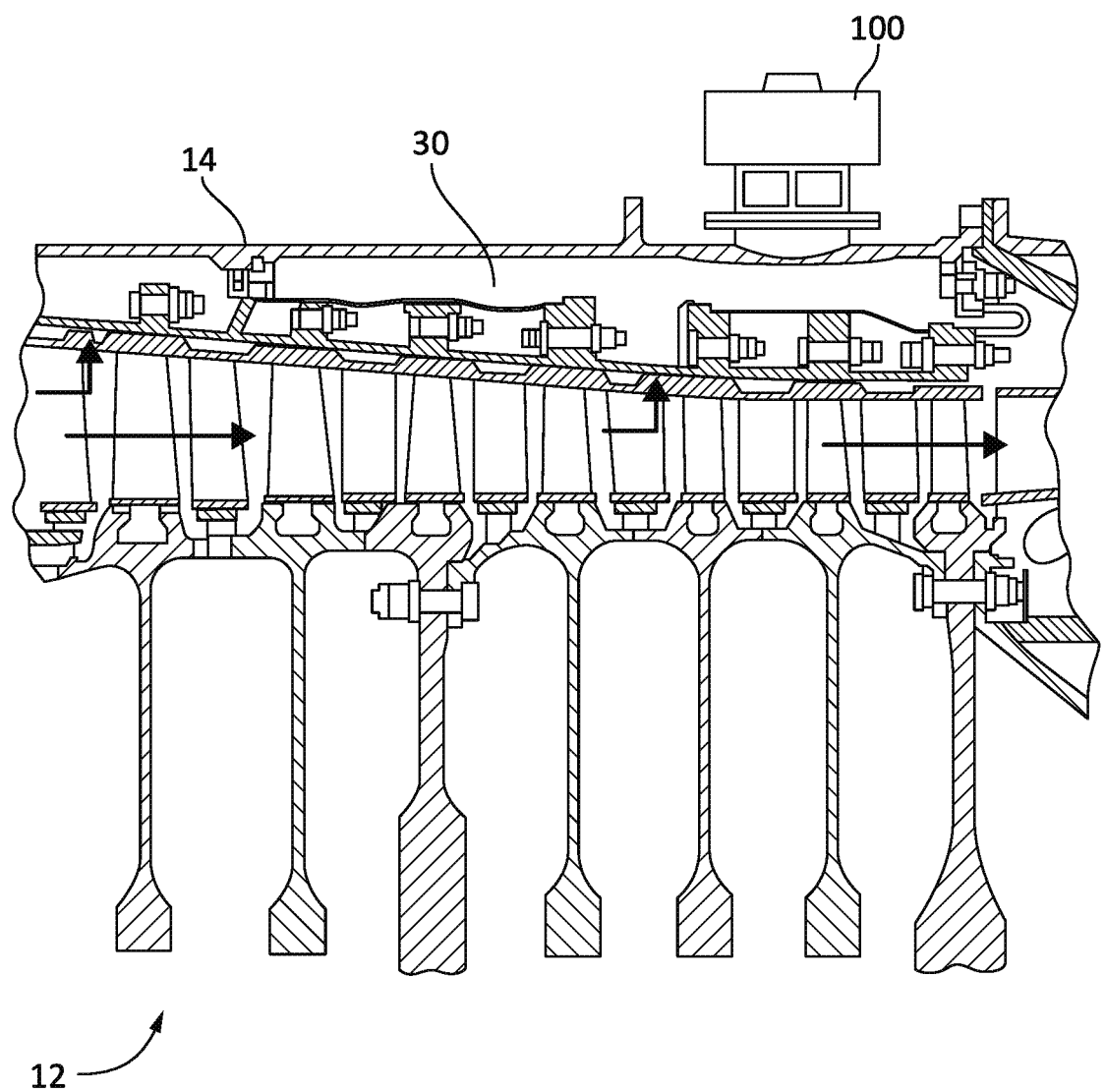
FIG. 2 is a schematic cross-sectional side elevation view of a portion of the gas turbine engine of FIG. 1.
Figure 3:
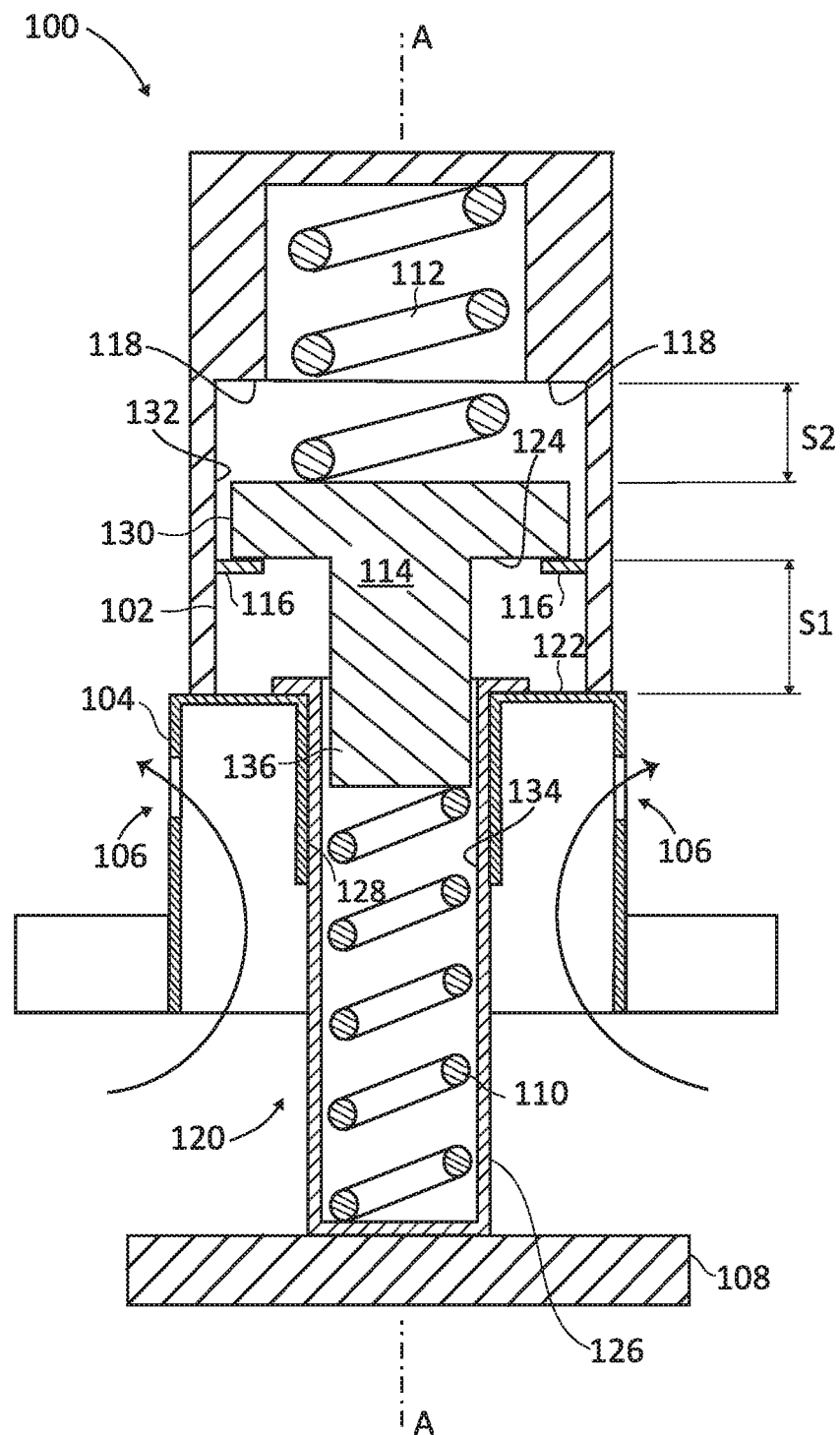
FIG. 3 is a schematic cross-sectional elevation view of an exemplary embodiment of a bleed valve constructed in accordance with the present disclosure, showing the poppet head in the fully open position.
Figure 4:
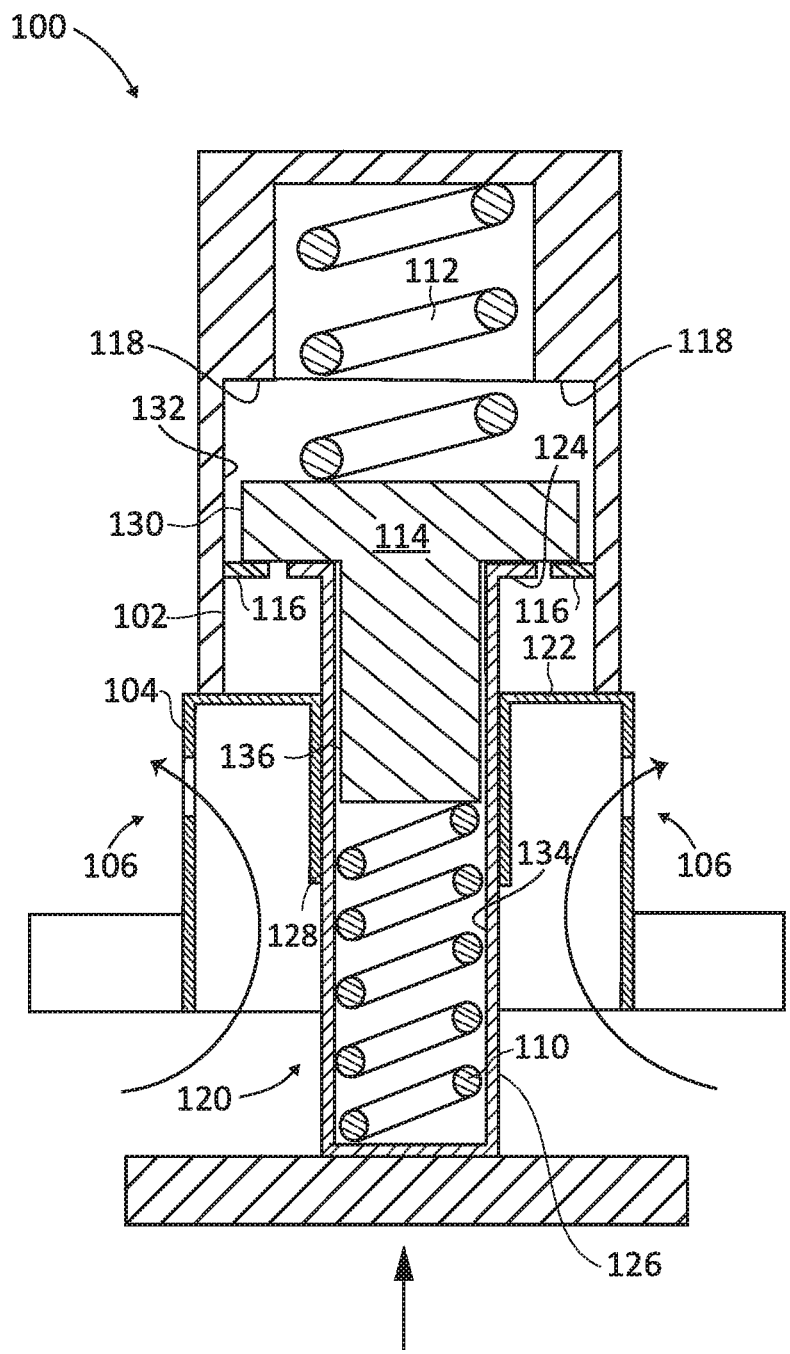
FIG. 4 is a schematic cross-sectional elevation view of the bleed valve of FIG. 3, showing the poppet head in the partially closed position.

With reference to FIG. 2, compressor section 12 and bleed valve 100 is shown. Gas turbine engine 10 (shown in FIG. 1) includes a plenum 30. Plenum 30 is in fluid communication with compressor section 12. Bleed valve 100 is in communication with plenum 30. When the plenum 30 is not pressurized, e.g. before start up, the bleed valve is in the fully open position shown in FIG. 3. When the plenum 30 begins to build pressure, as during start up, before the plenum 30 reaches operational pressure, the bleed valve 100 moves to a partially closed position as shown in FIG. 4. When the plenum 30 reaches operational pressure, e.g. after the engine 10 is through the startup phase, the bleed valve 100 moves to the fully closed position shown in FIG. 5. Each of these positions is describe in additional detail below. In the illustrated exemplary embodiment gas turbine engine 10 includes a single bleed valve 100. As will be appreciated by those of skill in the art in view of the present disclosure, gas turbine engine 10 can include more than one bleed valve, as suitable for an intended application.

With reference now to FIG. 3, the bleed valve 100 includes a valve housing 102 defining an inlet 104 and an outlet 106 with a flow path for fluid communication from the inlet 104 to the outlet 106 as indicated by the large arrows in FIGS. 3 and 4. A poppet head 108 is connected to the valve housing 102 by a primary spring 110 and by a secondary spring 112. The poppet head 108 is configured for movement relative to the valve housing 102 between a fully open position as shown in FIG. 3, a partially closed position as shown in FIG. 4, and a fully closed position as shown in FIG. 5.

In the fully open position shown in FIG. 3, the poppet head 108 is spaced apart from the inlet 104 to allow flow through the flow path as indicated by the large arrows in FIG. 3. In the fully open position, the primary spring 110 and the secondary spring 112 are both expanded.

In the partially closed position shown in FIG. 4, the poppet head 108 is spaced apart from the inlet 104 but is closer to the inlet 104 than in the fully open position of FIG. 3. In the partially closed position, the primary spring 110 is compressed. In the partially closed position, the flow path is reduced but can still accommodate a predetermine percentage of the fully open position flow as indicated by the large arrows in FIG. 4

Figure 5:
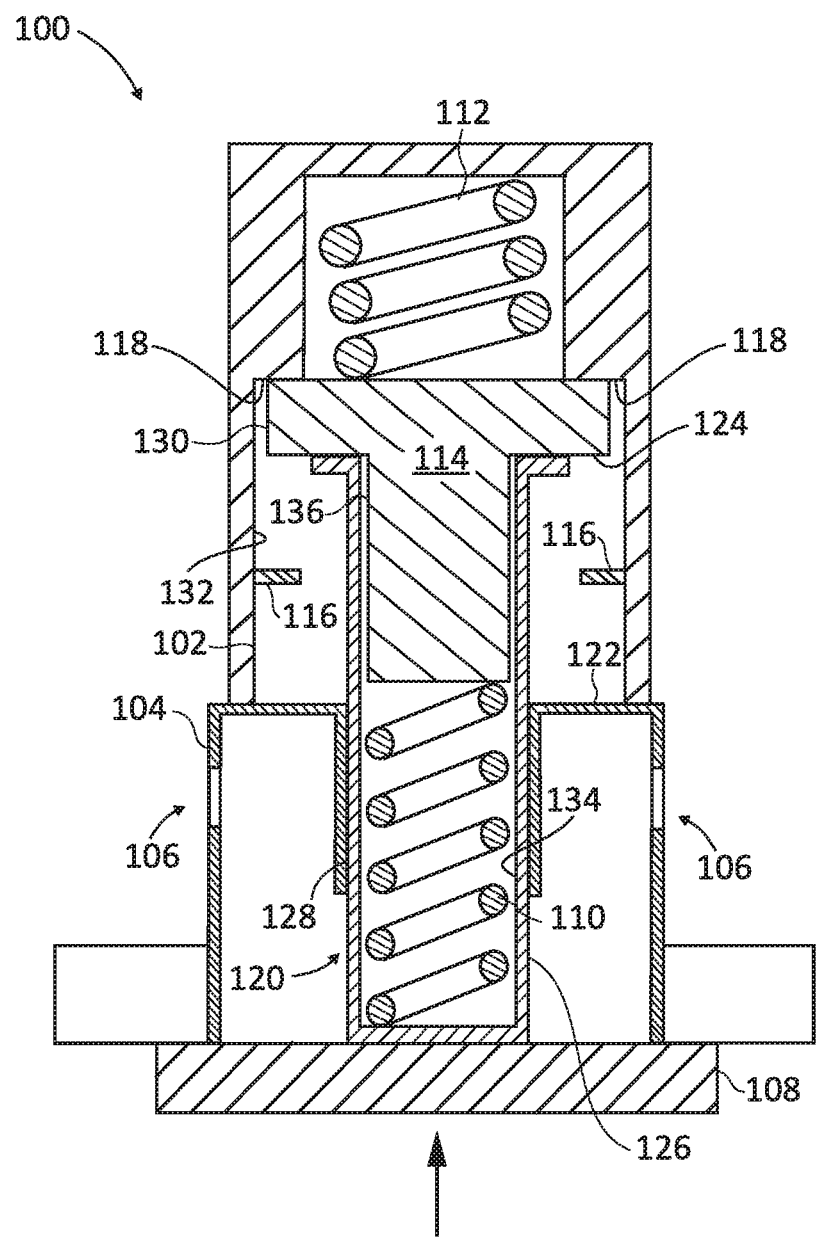
FIG. 5 is a schematic cross-sectional elevation view of the bleed valve of FIG. 3, showing the poppet head in the fully closed position.

In the fully closed position, shown in FIG. 5, the poppet head 108 seats against the valve housing 102 blocking the inlet 104 and blocking flow through the flow path, as indicated by the lack of the large arrows of FIG. 5 that are shown in FIGS. 3-4. In the fully closed position, the primary spring 110 and the secondary spring 112 are both compressed.

The primary spring 110 and the secondary spring 112 are both biased to position the poppet head 108 in the fully open position. The primary spring 110 and the secondary spring 112 are both biased in a single direction, i.e. downward as oriented in FIGS. 3-5 with the valve housing 102 as a stationary reference. The primary and secondary spring 110 and 112 are aligned along a longitudinal axis A, wherein the inlet 104 opens along the longitudinal axis A, and wherein the outlet 106 opens laterally with respect to the longitudinal axis A.

A secondary spring compressor 114 is included within the valve housing 102. The primary spring 110 connects between the poppet head 108 and the secondary spring compressor 114. The secondary spring 112 connects between the secondary spring compressor 114 and the valve housing 102. The valve housing 102 includes a first secondary spring compressor seat 116 configured to engage the secondary spring compressor in at least the fully open position as shown in FIG. 3 to limit travel of the secondary spring compressor 114 thereby limiting expansion of the secondary spring 112. The valve housing 102 also includes a second secondary spring compressor seat 118 configured to engage the secondary spring compressor 114 in the fully closed position as shown in FIG. 5 to limit travel of the secondary spring compressor 114 thereby limiting compression of the secondary spring 112.

A primary spring compressor 120 is included within the valve housing 102. The primary spring 110 connects between the primary spring compressor 120 and the secondary spring compressor 114. The poppet head 108 is joined to the primary spring compressor 120 for movement together therewith. The housing 102 includes a primary spring compressor seat 122 configured to engage the primary spring compressor 120 in the fully open position of FIG. 3 to limit travel of the primary spring compressor 120 thereby limiting expansion of the primary spring 110. The secondary spring compressor 114 includes a seating surface 124 configured to engage the primary spring compressor 120 in the partially closed and fully closed positions of FIGS. 4 and 5 thereby limiting compression of the primary spring 110.

The primary spring compressor 120 includes an outer piston surface 126 that is aligned with the longitudinal axis A and that engages a corresponding piston surface 128 of the valve housing 102 for piston movement of the primary spring compressor 120 within housing 102 along the axis A. The secondary spring compressor 114 includes a first piston surface 130 aligned with the longitudinal axis A that engages a corresponding piston surface 132 of the valve housing 102 for piston movement of the secondary spring compressor 114 within the valve housing 102 along the longitudinal axis A. The primary spring compressor 120 also includes an inner piston surface 134 engaged with a second piston surface 136 of the secondary spring compressor 114 for piston movement of the primary and secondary spring compressors 120 and 14 relative to one another along the longitudinal axis A.

The primary spring 110 can have a spring constant lower than that of the secondary spring 112. If peak opening force is defined as the product of maximum stroke times spring constant, the primary spring 110 has a peak opening force weaker than that of the secondary spring 112. The secondary spring 112 is pre-loaded pressing the secondary spring compressor 114 against the first secondary spring compressor seat 116 in the fully open and partially closed positions with a pre-loading force as shown in FIGS. 3 and 4. The peak opening force of the primary spring 110 is weaker than the pre-loading force of the secondary spring 112 so that in the partially closed position of FIG. 4, the primary spring 110 is compressed to its maximum stroke labeled S1 in FIG. 3 and the secondary spring 112 is still expanded to its maximum stroke S2, which is also labeled in FIG. 3. The full stroke of the poppet head 108 should be less than the sum of the strokes S1 and S2 of the primary and secondary springs 110 and 112.

If pressure forces increase pushing upward on poppet head 108 when in the partially closed position of FIG. 4 until the preloading force of the secondary spring 112 is overcome, the primary spring compressor 120 will press upward as oriented in FIG. 4 on secondary spring compressor 114, compressing the secondary spring 112. With enough pressure force acting on the poppet head 108, the poppet head 108 will reach the fully closed position shown in FIG. 5. This structure provides fully passive closure of a bleed valve 100, e.g., as pressure builds during startup of a gas turbine engine where the bleed valve 100 is positioned to bleed off pressure from the compressor section. The partially closed position and the fully closed position can be tuned for predetermined performance, e.g., so that the partially closed position closes off a given percentage of flow at a given intermediate pressure, and so the fully closed position occurs at a given operational pressure. No sensors or active actuators are required.

The methods and systems of the present disclosure, as described above and shown in the drawings, provide for bleed valves with superior properties including passively providing a partially closed position, fully open position, and fully closed position with reduced weight and complexity relative to conventional designs. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A bleed valve comprising:
   a valve housing defining an inlet and an outlet with a flow path for fluid communication from the inlet to the outlet; and
   a poppet head connected to the valve housing by a primary spring and by a secondary spring, wherein the poppet head is configured for movement relative to the valve housing between:
      a fully open position in which the poppet head is spaced apart from the inlet to allow flow through the flow path, wherein the primary spring and secondary spring are both expanded;
      a partially closed position in which the poppet head is spaced apart from the inlet but is closer to the inlet than in the fully open position, wherein the primary spring is compressed; and
      a fully closed position in which the poppet head seats against the valve housing blocking flow through the flow path, wherein the primary spring and the secondary spring are both compressed, a secondary spring compressor within the valve housing, wherein the primary spring connects between the poppet head and the secondary spring compressor, and wherein the secondary spring connects between the secondary spring compressor and the valve housing.

2. The bleed valve as recited in claim 1, wherein the primary spring and the secondary spring are both biased to position the poppet head in the fully open position.

3. The bleed valve as recited in claim 1, wherein the primary spring and the secondary spring are both biased in a single direction.

4. The bleed valve as recited in claim 1, wherein the valve housing includes a first secondary spring compressor seat configured to engage the secondary spring compressor in at least the fully open position to limit travel of the secondary spring compressor thereby limiting expansion of the secondary spring.

5. The bleed valve as recited in claim 4, wherein the valve housing includes a second secondary spring compressor seat configured to engage the secondary spring compressor in the fully closed position to limit travel of the secondary spring compressor thereby limiting compression of the secondary spring.

6. The bleed valve as recited in claim 1, further comprising a primary spring compressor within the valve housing, wherein the primary spring connects between the primary spring compressor and the secondary spring compressor.

7. The bleed valve as recited in claim 6, wherein the poppet head is joined to the primary spring compressor.

8. The bleed valve as recited in claim 6, wherein the housing includes a primary spring compressor seat configured to engage the primary spring compressor in the fully open position to limit travel of the primary spring compressor thereby limiting expansion of the primary spring.

9. The bleed valve as recited in claim 8, wherein the secondary spring compressor includes a seating surface configured to engage the primary spring compressor in the partially closed and fully closed positions thereby limiting compression of the primary spring.

10. The bleed valve as recited in claim 1, wherein the primary spring has a spring constant lower than that of the secondary spring.

11. The bleed valve as recited in claim 1, wherein peak opening force is defined as the product of maximum stroke times spring constant, wherein the primary spring has a peak opening force weaker than that of the secondary spring.

12. The bleed valve as recited in claim 11, further comprising a secondary spring compressor within the valve housing, wherein the primary spring connects between the poppet head and the secondary spring compressor, and wherein the secondary spring connects between the secondary spring compressor and the valve housing, wherein the valve housing includes a secondary spring compressor seat configured to engage the secondary spring compressor to limit travel of the secondary spring compressor thereby limiting expansion of the secondary spring, wherein the secondary spring is pre-loaded pressing the secondary spring compressor against the first secondary spring compressor seat in the fully open and partially closed positions with a pre-loading force, and wherein the peak opening force of the primary spring is weaker than the pre-loading force of the secondary spring so that in the partially closed position, the primary spring is compressed to its maximum stroke and the secondary spring is expanded to its maximum stroke.

13. The bleed valve as recited in claim 1, wherein the primary and secondary spring are aligned along a longitudinal axis, wherein the inlet opens along the longitudinal axis, and wherein the outlet opens laterally with respect to the longitudinal axis.

14. The bleed valve as recited in claim 1, wherein the primary and secondary spring are aligned along a longitudinal axis, further comprising:
   a primary spring compressor including a piston surface aligned with the longitudinal axis that engages a corresponding piston surface of the valve housing; and
   a secondary spring compressor including a piston surface aligned with the longitudinal axis that engages a corresponding piston surface of the valve housing.

15. The bleed valve as recited in claim 1, wherein the housing is devoid of inlets and outlets between a primary spring compressor seat and a second secondary spring compressor seat.

16. A bleed valve comprising:
   a valve housing defining an inlet and an outlet with a flow path for fluid communication from the inlet to the outlet; and
   a poppet head connected to the valve housing by a primary spring and by a secondary spring, wherein the poppet head is configured for movement relative to the valve housing between:
      a fully open position in which the poppet head is spaced apart from the inlet to allow flow through the flow path, wherein the primary spring and secondary spring are both expanded;
      a partially closed position in which the poppet head is spaced apart from the inlet but is closer to the inlet than in the fully open position, wherein the primary spring is compressed; and a fully closed position in which the poppet head seats against the valve housing blocking flow through the flow path, wherein the primary spring and the secondary spring are both compressed, wherein peak opening force is defined as the product of maximum stroke times spring constant, wherein the primary spring has a peak opening force weaker than that of the secondary spring,
   further comprising a secondary spring compressor within the valve housing, wherein the primary spring connects between the poppet head and the secondary spring compressor, and wherein the secondary spring connects between the secondary spring compressor and the valve housing, wherein the valve housing includes a secondary spring compressor seat configured to engage the secondary spring compressor to limit travel of the secondary spring compressor thereby limiting expansion of the secondary spring, wherein the secondary spring is pre-loaded pressing the secondary spring compressor against the first secondary spring compressor seat in the fully open and partially closed positions with a pre-loading force, and wherein the peak opening force of the primary spring is weaker than the pre-loading force of the secondary spring so that in the partially closed position, the primary spring is compressed to its maximum stroke and the secondary spring is expanded to its maximum stroke.

\* \* \* \* \*